(12) United States Patent
O'Donnell (10) Patent No.: US 6,711,597 B1
(45) Date of Patent: *Mar. 23, 2004

(54) INTERPOLATION METHOD USING PRE-EMPHASIZED INPUT SAMPLES

(75) Inventor: Eugene Murphy O'Donnell, Fishers, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/719,884

(22) PCT Filed: May 6, 1999

(86) PCT No.: PCT/US99/09871

§ 371 (c)(1),
(2), (4) Date: Dec. 19, 2000

(87) PCT Pub. No.: WO99/67955

PCT Pub. Date: Dec. 29, 1999

Related U.S. Application Data

(60) Provisional application No. 60/090,294, filed on Jun. 23, 1998.

(51) Int. Cl.[7] .............................. G06F 7/38; H04N 9/28
(52) U.S. Cl. ....................... 708/290; 708/313; 348/807; 315/368.11
(58) Field of Search ................................ 708/270, 271, 708/272, 273, 274, 290, 313, 445; 348/745, 746, 747, 807; 315/367, 368.11, 368.12, 368.13

(56) References Cited

U.S. PATENT DOCUMENTS 5,345,280 A 9/1994 Kimura et al.
5,471,411 A 11/1995 Adams et al.

FOREIGN PATENT DOCUMENTS

| EP | 0797361 | 9/1997 |
|---|---|---|
| JP | 3-13093 | 1/1991 |
| JP | 8-204506 | 8/1996 |
| JP | 9-55956 | 2/1997 |

OTHER PUBLICATIONS

Patent Abstracts of Japan, vol. 97, No. 6, Jun. 30, 1997 & JP 9–055956.
Patent Abstracts of Japan, vol. 15, No. 130, Mar. 29, 1991 & JP 3–013093.
Patent Abstracts of Japan, vol. 96, No. 12, Dec. 26, 1996 & JP 8–204506.

*Primary Examiner*—Chuong Dinh Ngo
(74) *Attorney, Agent, or Firm*—Joseph S. Tripoli; Joseph J. Laks; Harvey D. Fried (57) ABSTRACT

A method for producing a plurality of successive output data values defining an output curve that approximates an input curve defined by a plurality of input sample values, the output data values having a higher sampling frequency than the input sample values, the method comprising the steps of: pre-emphasizing the plurality of input sample values; defining successive and overlapping intervals including at least three of the pre-emphasized input sample values; interpolating a plurality of the output data values in an interpolation interval by calculating a moving average of a linear interpolation curve based on the at least three pre-emphasized input sample values, each of the output data values being influenced by the at least three pre-emphasized input sample values; and, emphasizing differently the influence of the at least three pre-emphasized input sample values for determining different ones of the output data values in the interpolation interval, whereby the pre-emphasizing step brings the output curve controllably close to each of the input sample values and each incremental slope of the output curve varies smoothly between adjacent output data values.

11 Claims, 10 Drawing Sheets

INTERPOLATION METHOD USING PRE-EMPHASIZED INPUT SAMPLES

This application claims the benefit or Provisional application Ser. No. 60/090,294 filed Jun. 23, 1998.

BACKGROUND OF THE INVENTION

This invention relates to the interpolation of correction factors used for points between discrete correction sample points such as a matrix of points in an array or a series of spaced points along a line. Correction factors for particular data points are determined by preprocessing the correction factor data from weighted sector data leading and trailing the sector in which a particular point is located. This preprocessing modifies the correction factors input into a second order piecewise interpolation process for the sector of the particular point, and smoothly approximates an ideal correction curve using relatively few correction factors and minimal data processing operations. The invention is applicable, for example, to a digital convergence correction system that interpolates between points in a matrix of convergence correction points for a color CRT display, or image data that is up-converted, or time-domain sampled audio signals.

For the purposes of convergence control, the active scan area of a display screen may be divided into a matrix of rows and columns having factors corresponding to spaced points on the display. The number of rows and columns, and the number of resulting sections, are selected depending on the desired precision of correction. At each grid point in the matrix, a correction value is determined empirically by superimposing the red, green and blue rasters at that point, and noting the correction values that cancel any distortion and precisely align the rasters at that point. The value for each raster at each matrix point is stored, for example in a memory. The successive correction points in a line across the display are intended to represent the ideal correction curve. To effect correction, the values of the points on the curve are read out during display of the rasters, generally in successive horizontal lines, for example using a digital to analog converter coupled to drive correction coils that adjust the positions of the CRT electron beams for each color.

The number of correction points is less than the number of sampling points employed in reading out the correction factors. Therefore the correction points in the matrix can only approximate the ideal correction curve. An interpolation is performed in the horizontal and vertical directions to define additional values for the sampling points located between the stored values of the correction matrix. The correction curve should pass smoothly through adjacent correction values to avoid abrupt changes in the slope of the correction curve across the display, which cause undesirable visible bands in the display. Interpolation in the horizontal direction may be performed, for example, by low pass filtering the correction signal from the digital to analog converter, or by FIR filters.

In a vertical direction (or other direction), interpolation may be accomplished using computations to fit a low-order polynomial curve to a set of adjustment points. The adjustment points are defined or modified to provide a smooth and continuous correction curve. The calculations needed for such an interpolation function can be numerous, complex and memory intensive. A computation that forces the correction curve to progress linearly from one matrix adjustment value to the next may produce sharp inflections or changes in slope at the grid points. Sharp slope changes cause undesirable visual artifacts, referred to as "banding," that are visible as shade variations in the displayed picture. It is possible to process the correction curve values to limit the change in slope that will be permitted from point to point. This is a form of low pass filtering, and eliminates or attenuates some valid corrections that it would be advantageous to retain. This is particularly true for high bandwidth signals.

The problem of recovering an ideal signal such as a correction waveform from a succession of sample values is confronted in a variety of situations. If the number of samples is limited, it is not possible to identically recover all the frequency components of an input signal. Reading out the factors successively produces a stair-step signal. Linearly interpolating between the factors produces a varying sawtooth signal. Both corrections introduce high frequency components, namely abrupt slope changes that need to be filtered out using low pass filtering, which eliminates or attenuates valid higher frequency components.

For some applications the solution is to employ a larger number of factors or samples to define the waveform to be recovered. By sampling the waveform at a frequency higher than the Nyquist frequency the input waveform can be substantially recovered. Using a large number of sampling points or factors improves accuracy but is memory intensive. For other applications a computational filter such as a finite impulse response filter can be used. This solution requires computational resources and time for the filter to arrive at its best correction factors. It also introduces deviations from the original sampled data. Neither of these solutions is optimal. In such an application it may be desirable to minimize the number of factors that define the waveform and thereby to conserve memory. It is also desirable to avoid introducing high frequency components that correspond to abrupt changes in slope, and yet to obtain a relatively accurate representation of the input waveform wherein desirable slope changes are not unduly attenuated. These objectives should be achieved with a minimal computational burden in time and processing power.

SUMMARY OF THE INVENTION

An interpolation method in accordance with the inventive arrangements advantageously minimizes the number of factors that are needed to define the waveform and thereby to conserves memory. High frequency components that correspond to abrupt changes in slope are advantageously avoided, and yet, a relatively accurate representation of the input waveform is advantageously obtained wherein desirable slope changes are not unduly attenuated. Moreover, the problems of the prior art are advantageously achieved with a minimal computational burden in time and processing power.

A method for producing a plurality of successive output data values defining an output curve that approximates an input curve defined by a plurality of input sample values, output data values having a higher sampling frequency than the input sample values, in accordance with the inventive arrangements comprises the steps of: pre-emphasizing the plurality of input sample values; defining successive and overlapping intervals including at least three of the pre-emphasized input sample values; interpolating a plurality of the output data values in an interpolation interval by calculating a moving average of a linear interpolation curve based on the at least three pre-emphasized input sample values, each of the output data values being influenced by the at least three pre-emphasized input sample values; and, emphasizing differently the influence of the at least three pre-emphasized input sample values for determining different ones of the output data values in the interpolation interval, whereby the pre-emphasizing step brings the output curve controllably close to each of the input sample values and each incremental slope of the output curve varies smoothly between adjacent output data values.

The pre-emphasizing step can comprise the steps of: generating sampling factors based on the input sample values; and, using the sampling factors in the interpolating step.

The method can comprise the step of generating the sampling factors based on exactly three of the input sample values, whereby the output curve approximates the input curve within a precision of approximately 6%.

The method can comprise the step of generating the sampling factors based on at least five of the input sample values, whereby the output curve approximates the input curve within a precision at least approximately 1%.

The method can comprise the step of generating the sampling factors based on at least seven of the input sample values, whereby the output curve approximates the input curve within a precision at least approximately 0.1%.

The emphasizing step can comprise the steps of: ordering the pre-emphasized input sample values in each the interval such that a given one of the pre-emphasized input samples is preceded by a pre-emphasized input sample value and followed by a trailing pre-emphasized input sample value; emphasizing the influence of the preceding pre-emphasized input sample value when calculating the output data values preceding the given pre-emphasized input sample value; and, emphasizing the influence of the following pre-emphasized input sample value when calculating the output data values following the given pre-emphasized input sample value.

The method can comprise the step of shifting the interpolation interval by a selected number of the output data samples.

The method can further comprise the steps of: selecting the averaging interval to be an even number P of the interpolation intervals; and, selecting a value for P such that 2*P is a factor of two.

The interpolating step can comprises the step of using a ramp function for calculating incremental slopes preceding and following each the interpolation interval, the ramp function determining a smooth transition between adjacent ones of the interpolation intervals. The using a ramp function can comprise the steps of: calculating a first mean value based on the input sample values preceding each the interpolation interval; and, calculating a second mean value based on the input sample values following each the interpolation interval.

The pre-emphasizing step can comprise the steps of: defining successive and overlapping pre-emphasis intervals including at least three of the input sample values; and, successively pre-emphasizing a given input sample value in each the pre-emphasis interval, based on preceding and following ones of the input sample values in each the pre-emphasis interval.

Another method for producing a plurality of successive output data values defining an output curve that approximates an input curve defined by a plurality of input sample values, the output data values having a higher sampling frequency than the input sample values, in accordance with the inventive arrangements, comprises the steps of: defining successive and overlapping pre-emphasis intervals including at least three of the input sample values; successively pre-emphasizing a given input sample value in each the pre-emphasis interval, based on preceding and following ones of the input sample values in each the pre-emphasis interval; defining successive and overlapping interpolation intervals including a plurality of the pre-emphasized input sample values; interpolating a plurality of the output data values in an interpolation interval such that each incremental slope of the correction curve between adjacent output data values varies smoothly and the plurality of input sample values do not lie on the correction curve; and, adjusting the input sample values to control convergence correction, whereby the output curve closely approximates the input curve without banding artifacts.

The pre-emphasizing step can comprise the steps of: generating sampling factors based on the input sample values; and, using the sampling factors in the interpolating step.

The method can comprise the step of including exactly three of the input sample values in each the pre-emphasis interval, whereby the output curve approximates the input curve within a precision of approximately 6%.

The method can comprise the step of including at least five of the input sample values in each the pre-emphasis interval, whereby the output curve approximates the input curve within a precision of at least approximately 1%.

The method can comprise the step of including at least seven of the input sample values in each the pre-emphasis interval, whereby the output curve approximates the input curve within a precision of at least approximately 0.1%.

The emphasizing step can comprise the steps of: ordering the pre-emphasized input sample values in each the interval such that a given one of the pre-emphasized input samples is preceded by a pre-emphasized input sample value and followed by a trailing pre-emphasized input sample value; emphasizing the influence of the preceding pre-emphasized input sample value when calculating the output data values preceding the given pre-emphasized input sample value; and, emphasizing the influence of the following pre-emphasized input sample value when calculating the output data values following the given pre-emphasized input sample value.

The method can comprising the further step of shifting the interpolation interval by a selected number of the output data samples.

The method can also comprise the steps of: selecting the averaging interval to be an even number P of the interpolation intervals; and, selecting a value for P such that 2*P is a factor of two.

The interpolating step can comprises the step of using a ramp function for calculating incremental slopes preceding and following each the interpolation interval, the ramp function determining a smooth transition between adjacent ones of the interpolation intervals. The using a ramp function step can comprise the steps of: calculating a first mean value based on the input sample values preceding each the interpolation interval; and, calculating a second mean value based on the input sample values following each the interpolation interval.

DETAILED DESCRIPTION OF THE PREFERRED EMBODIMENTS

The invention concerns an optimized process and device for generating a waveform from a succession of factors defining the waveform, and is particularly applicable to recovering waveforms from a minimum number of samples with minimal computational overhead. The invention is applicable to various situations but is illustrated with respect to a digital convergence correction system in which a matrix of factors for points spatially distributed on a display is stored and used to generate correction waveforms for each color raster of the display.

Figure 1A:
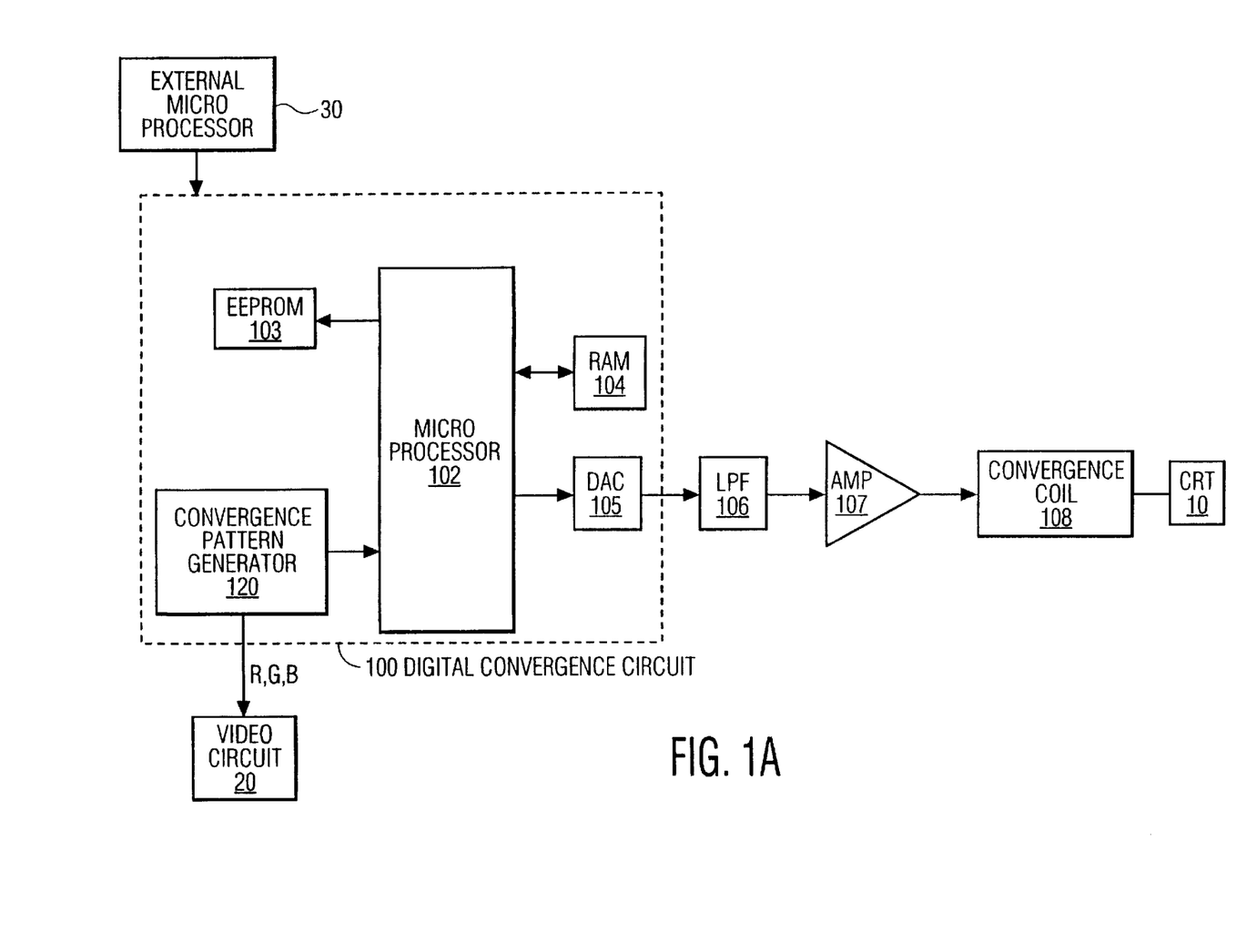
FIG. 1A is a block diagram of a digital convergence system.

A digital convergence system as shown in FIG. 1A generally comprises a convergence pattern generator, an amplifier for driving convergence correction coils or yokes, a memory for storing correction constants, and an interface with a microprocessor. The convergence system is used to determine and store a matrix of correction factors for the position of each of the color rasters at spaced points in a display. The system determines additional correction values from the matrix, including values for points between the points in the matrix. During display of a signal, the correction values are read out through a digital to analog converter and amplifier to drive the convergence correction coils. The convergence correction coils superimpose a deflection signal on a main signal that is otherwise generated and causes the rasters to scan on a display screen.

The digital convergence system includes an internal microprocessor 102. An external microprocessor 30 can be provided for independent convergence correction. The internal microprocessor controls the output to the convergence correction coils. The internal and/or external microprocessors can manage determination of the matrix of correction factors by the customer or as a setup or maintenance procedure by a technician. An example of customer convergence correction would be revising the convergence correction needed to correct for picture shifting when a projection television is moved to a different orientation in the Earth's magnetic field.

FIG. 1A illustrates a system that may use an advantageous digital convergence method according to this invention.

Digital convergence circuit 100 also includes EEPROM 103, internal RAM 104, digital to analog converter (DAC) 105 and a convergence pattern generator 120.

Adjustment is via a set of adjustment points for each of the three colors. Generally, an on-screen video pattern generator, such as convergence pattern generator 120, provides a location reference for adjustments. Adjustment data is stored in EEPROM 103 and read into internal RAM 104 on power-up. Internal RAM 104 has capacity for X (number of alignment points horizontally) by Y (number of alignment points vertically) by two (horizontal/vertical) by three (R, G, B) factors.

Figure 1B:
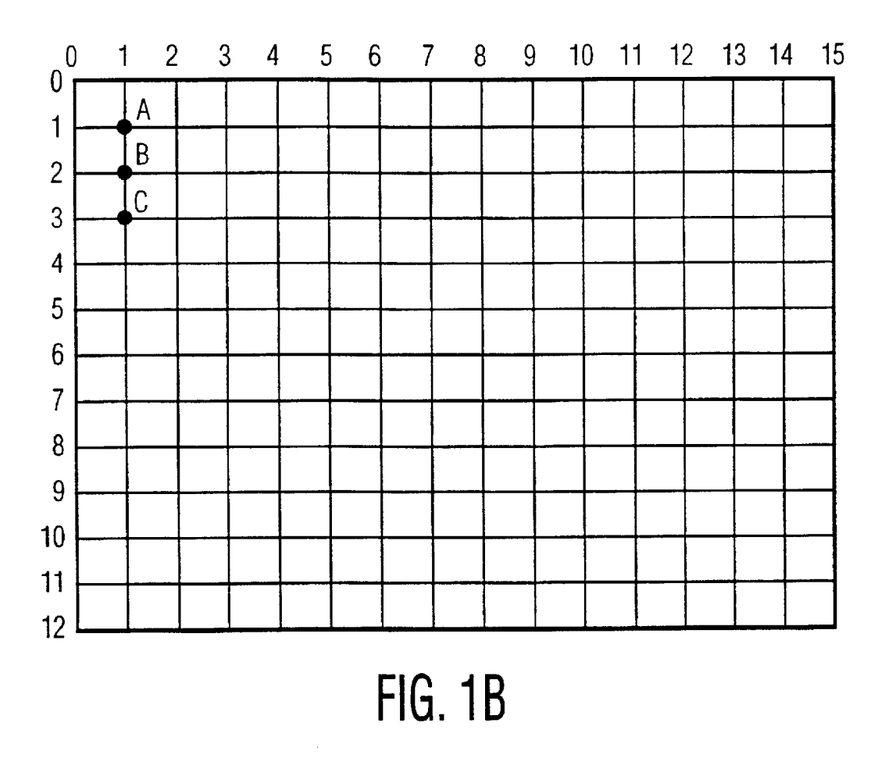
FIG. 1B illustrates a convergence correction grid.

The active scan area of a display means, for example, can be divided for purposes of convergence control into rows and columns defining a rectilinear grid, with adjustment factors stored only for the points at the grid line crossings. FIG. 1B shows a display screen defined with such a cross hatch grid in which the active area is defined by the outer rectangle. In this example thirteen vertical grid points or samples is provided, and sixteen horizontal samples, but any number of sample points is possible, depending on the desired precision of correction in the resulting raster. The samples are used to determine the convergence correction of each raster in the respective area of the grid, including the points at the grid line crossings and also the points between the grid line crossings. According to an inventive aspect, the local correction takes into account the correction values for more remote areas of the grid that precede and follow a particular point, using a pre-emphasis technique that adjusts the input values presented to an interpolation process.

Referring again to FIG. 1A, the digital convergence system supplies plus-or-minus horizontal and vertical convergence signals for each of the three colors. Three output stages, namely low pass filter 106, amplifier 107 and coil 108 are provided, being shown for one color only in FIG. 1A. The correction data is provided by microprocessor 102 to digital to analog converter 105. Low pass filter 106 removes or attenuates higher frequency components, and amplifier 107 provides a current output to drive convergence coil 108 as a function of the output of the low pass filter. Amplifier 107 can be a feedback amplifier that responds to the current level in convergence yoke 108 and drives the yoke to match the level dictated by the output of digital to analog converter (DAC) 105. The ideal drive current in convergence coil 108 is that necessary to cause the color raster image on CRT 10 to be correctly aligned, without distortion and corresponding accurately with the images from the other two colors.

In FIG. 1B, points A, B and C are three locations along a line (in this case a vertical line), for which convergence correction factors are defined and stored. The value of the convergence correction factors at grid points A, B and C will be referred to as F1(0), F1(1) and F1(2), respectively. Convergence correction data for additional points along the line between adjustment points A, B and C is calculated by interpolation.

Figure 2:
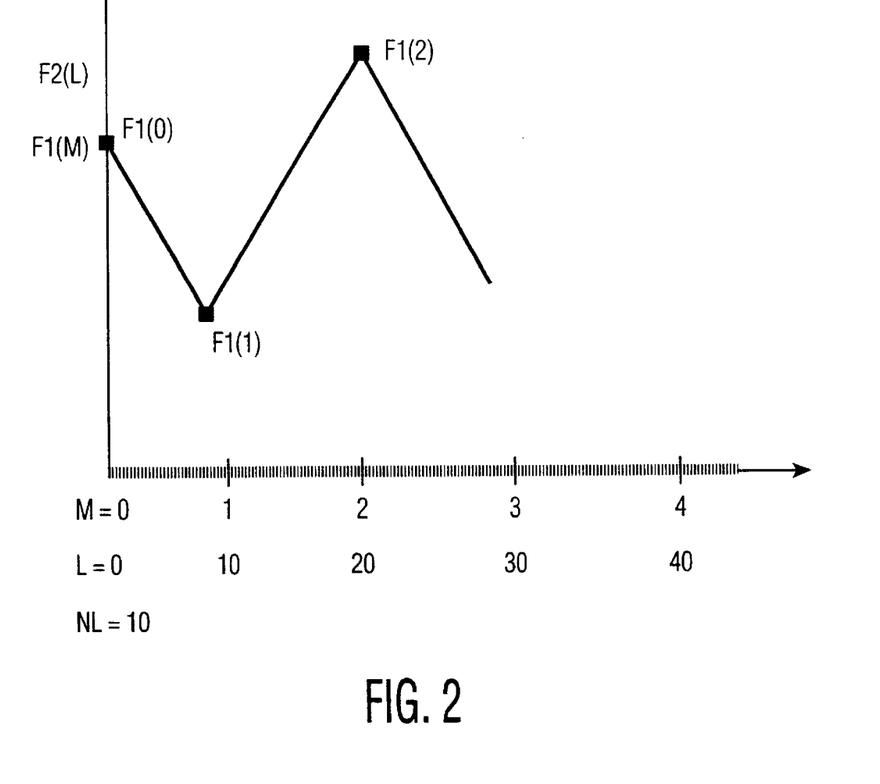
FIG. 2 graphically illustrates interpolation values according to a linear calculation.

FIG. 2 is an exemplary plot of the values of the convergence factors along the line of adjusting points that includes points A, B and C. In the figure, the Y axis represents the correction factor values and the X axis represents the point positions. Along the X axis, M is the increment of the stored adjustment points for convergence correction. Including the interpolation points between the stored adjustment points are additional points at which calculated correction values are to be read out to DAC 105 in FIG. 1A. L represents an index of points between adjustment points for the purposes of calculating interpolated convergence correction values. Thus F1(M) represents the unprocessed convergence correction point data of the matrix. Assuming a linear interpolation between successive correction point values as shown, F2(L) represents the interpolated convergence correction data for the output samples, corresponding to straight line segments between adjustment points.

Figure 3:
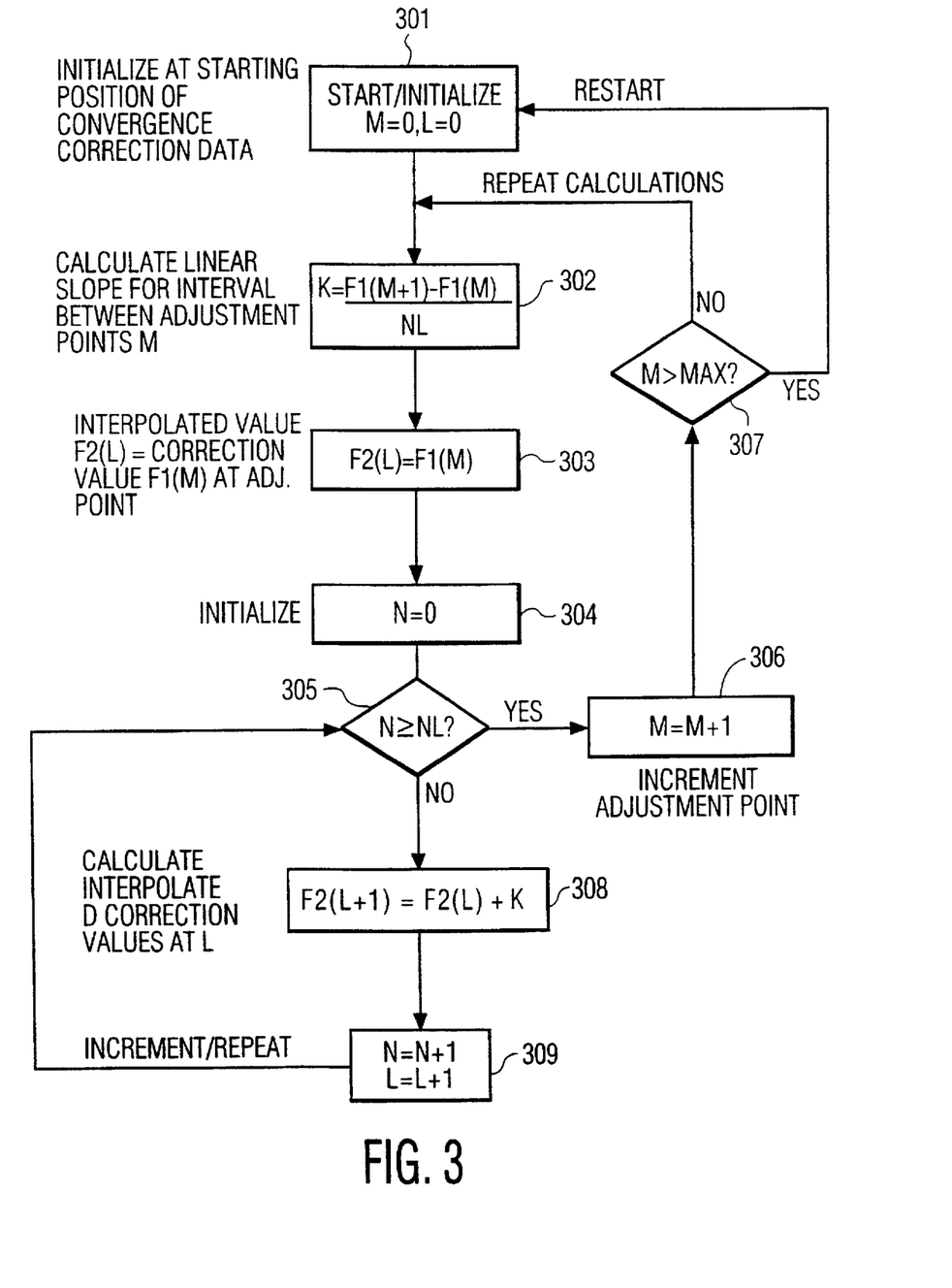
FIG. 3 is a flow diagram for implementing linear interpolation.

A linear interpolation calculation to determine correction values at intermediate points L, for example the interval M to (M+1), is shown in FIG. 3. FIG. 3 is a flow diagram wherein the counters M and L are initialized to zero at block 301. The incremental change K from one point L to the next in the interval between factors M to M+1 is determined at block 302 by averaging the difference between adjacent matrix factors F1(M) and F1(M+1) over the number of output values NL (which is ten in the example of FIG. 2). Block 303 initializes the output F2(L) of the first intermediate output point to the value of the matrix factor F1(M) and block 304 resets a counter for the intermediate output points between M and M+1. Steps or blocks 305, 308 and 309 form a loop in which the incremental or average difference K is successively added to the previous value of output F2(L) until the output values for points between M and M+1 are determined. The average value K defines a constant slope between M and M+1, resulting in the straight line of FIG. 2. The process is repeated between the next matrix factors (M+1 to M+2) and so on until all the output correction values have been determined. Factor K is recalculated to define a new slope between each pair of matrix points. The abrupt changes in slope produce banding in the display.

Figure 4A:
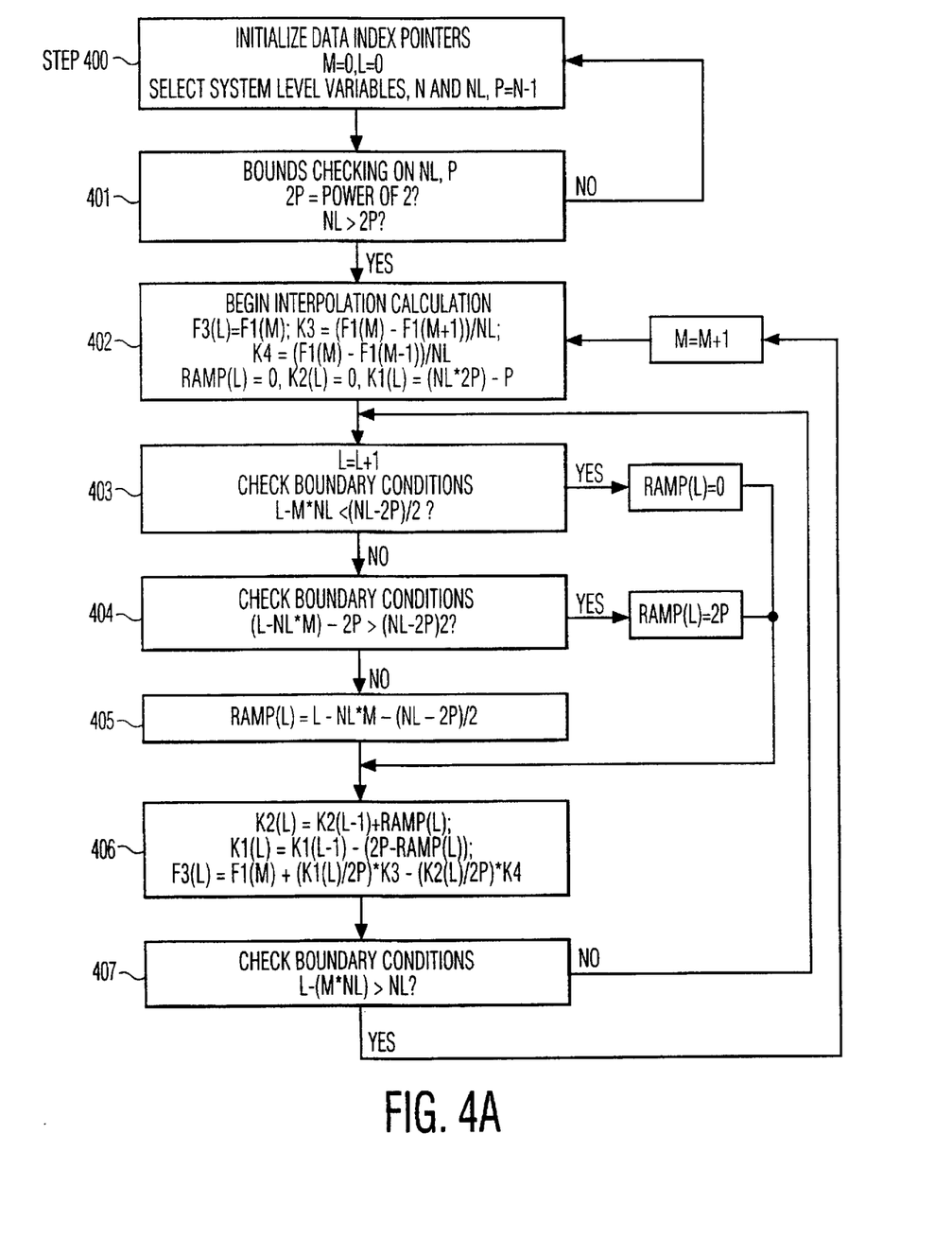
FIG. 4A is a flow diagram for an interpolation method according to an aspect of this invention.

FIG. 4 demonstrates an inventive interpolation technique in which the slope between the output values for points L between matrix factors M is smoothly varied as a function of the values of some adjacent points. More particularly, the interpolation process according to FIG. 4 shifts or offsets the interval to be interpolated a selected number of output samples P. In addition, progressing through the output points over the span of interpolation, a factor Ramp(L) shifts from emphasis on a sample-to-sample incremental slope K4 representative of the slope of the previous interval (e.g., M−1 to M), to an incremental slope K3 representative of the next interval (M to M+1). The offset factor P is constrained such that the number of lines NL between matrix factors must be greater than 2P, and the value of 2P must be a factor of two. These constraints provide a smooth correction curve and substantially simplify the calculations needed to determine an output correction value F3(L) for each point L between the matrix points.

According to the process shown in FIG. 4A, the resulting curve is not forced to pass directly through the adjustment points defined by the matrix points. That is, F3(L) does not necessarily equal F1(M). However, in setting up the matrix of adjustment factors originally, the technician also determines the values of the matrix factors. During setup, the matrix factors are set such that the values of F1(M) are displaced from the ideal correction curve sufficiently that the output values F3(L) closely approximate the ideal curve.

The general interpolation calculation according to the method shown in FIG. 4A is:

$$F3(L)=\text{AVG}(F2(L-N) \ldots F2(L+N))$$

where L represents an index to the interpolated data and N determines the span of leading and trailing points over which smoothing is applied. The interval to be averaged may be shifted by variable P, where P=N−1 and 2P is a power of two:

$$F3(L)=\text{AVG}(F2(L-P) \ldots F2(L+N))$$

To calculate the smoothed curve value F3(L), it is necessary to sum the data points in the interval from L−P to L+N, and divide by (P+N+1). By selecting P=N−1 and 2P as a power of two, the calculation of the function F3(L) in binary math for the interval (L−P) to (L+N) is simplified because the divide operation is merely a bit shift operation.

FIG. 4A illustrates a flow diagram of an advantageous interpolation process. Steps 400, 401, 402, 403, 404, and 405 show initializaton calculations according to this method, namely determining the values of four factors, K1, K2, K3 and K4, from the matrix values F1(M−1), F1(M) and F1(M+1) as well as the number of output samples NL per matrix segment and the offset P. Factor K2 is initially zero (block 402) and is changed by an incremental amount Ramp(L) (block 406) that is determined in a loop between L=0 and L=2P (blocks 403–405).

Step 400 initializes the data indices and system parameters N, L and P. The value for P is selected to determine the number of points to be averaged by the inventive interpolation method, which determines the level of smoothing desired. Some considerations for selecting P are that the span of lines 2P cannot be greater than NL, and preferably P=N−1. The value of 2P should be a power of two for simplification of division.

Step 400 resets the counters M and L, and may also permit the operator to input system level variables, N, NL and P. Unless these factors are preliminarily set and comply with the constraints, step 401 can be provided to check the boundaries and values of the parameters, prompting the operator to re-enter selections if the constraints are not met.

The interpolation process begins at Step 402, which initializes Ramp(L) and K2(L) to zero and calculates values for the remaining factors, which values will remain constant through the interpolation segment. The constants K1 and K2 are a function of L, which is the same as in simple linear interpolation according to FIGS. 2 and 3. K1 is a constant equal to (2P*NL)−P. This offsets the averaging interval to the right, due to P being N−1. It is also possible to use P=N+1, such that the initialization is K1=(2P*NL)+P, with the averaging interval offset to the left. Constants K3 and K4 are calculated in accordance with the equation of Step 402 and represent the linear average incremental change between points L in the sectors following and leading matrix point M, respectively.

Since F2(L+1)=F2(L)+K and F2(L)=F1(M), according to linear interpolation methods as described with reference to FIG. 3, the equation of F3(L) can be simplified, as shown in step 406 of FIG. 4A, to:

$$F3(L)=F1(M)+K1(L)/2P*K3-(K2(L)/2P)*K4$$

where $$K3=(F1(M)-F1(M+1))/NL$$

and $$K4=(F1(M)-F1(M-1))/NL$$

A ramp function Ramp(L) is generated as shown in Step 405. This function increments when L−(NL*M) is greater than (NL−2P)/2, and flattens when L−(NL*M) exceeds 2P+(NL−2P)/2. Function Ramp(L) causes a transition from one segment to the next. The boundary conditions are detected in steps 403 and 404, forming a loop. At steps 403, 404 and 405 the function Ramp(L) is defined as:

IF $(L-NL*M)<(NL-2P)/2$ THEN Ramp$(L)=0$

IF $(L-NL*M)-2P>(NL-2P)/2$ THEN Ramp$(L)=2P$

ELSE Ramp$(L)=L-NL*M-(NL-2P)/2$

Step 406 calculates factors K1 and K2 and uses the two factors to set the output value F3(L):

$K2(L)=K2(L-1)+$Ramp$(L)$ $K1(L)=K1(L-1)-(2P-$Ramp$(L))$ $F3(L)=F1(M)+(K1(L)/2P)*K3-K2(L)/SP)*K4$ Step 407 checks the boundary conditions and loops until the interpolation is completed and then counter M is incremented and the interpolation process continues at step 402 for the next segment, with resetting Ramp(L) and K2 and recalculating the remaining factors for the next segment.

Figure 4B:
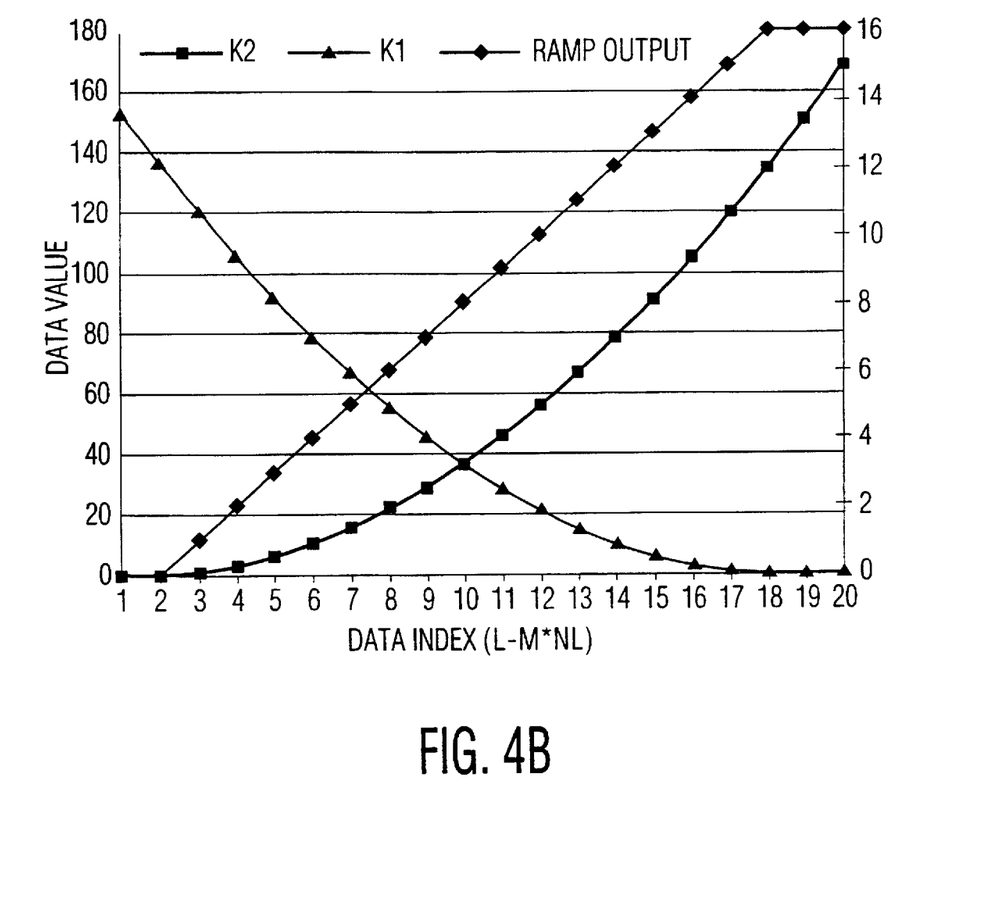
FIG. 4B graphically illustrates constants generated for an interpolation method according to an aspect of this invention.

The foregoing functions are graphically illustrated in FIG. 4B for a specific case where NL=20 and 2P=16. FIG. 4B represents the output data of Ramp(L), K1 and K2 (ordinate) versus L (abscissa). The right ordinate is the data corresponding to the Ramp output and the left ordinate corresponds to the K1, K2 data.

Figure 5:
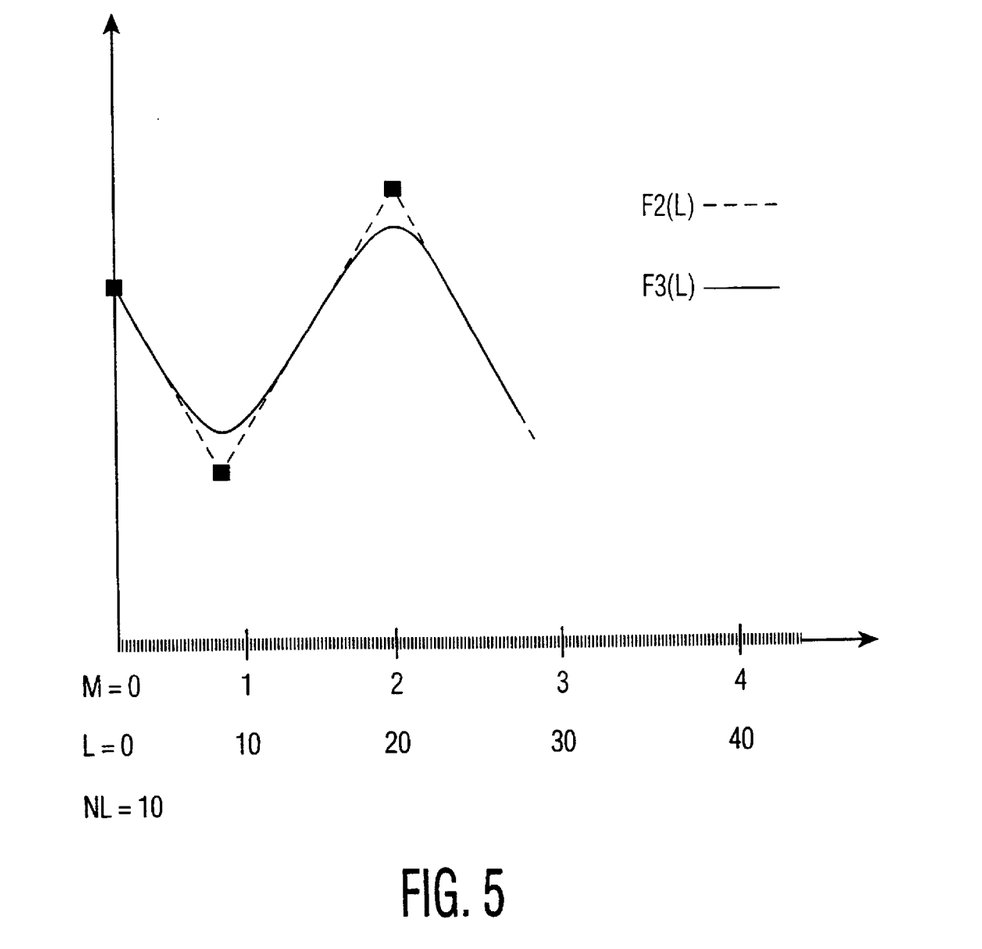
FIG. 5 graphically illustrates the effect of an interpolation method according to an aspect of this invention.
Figure 6:
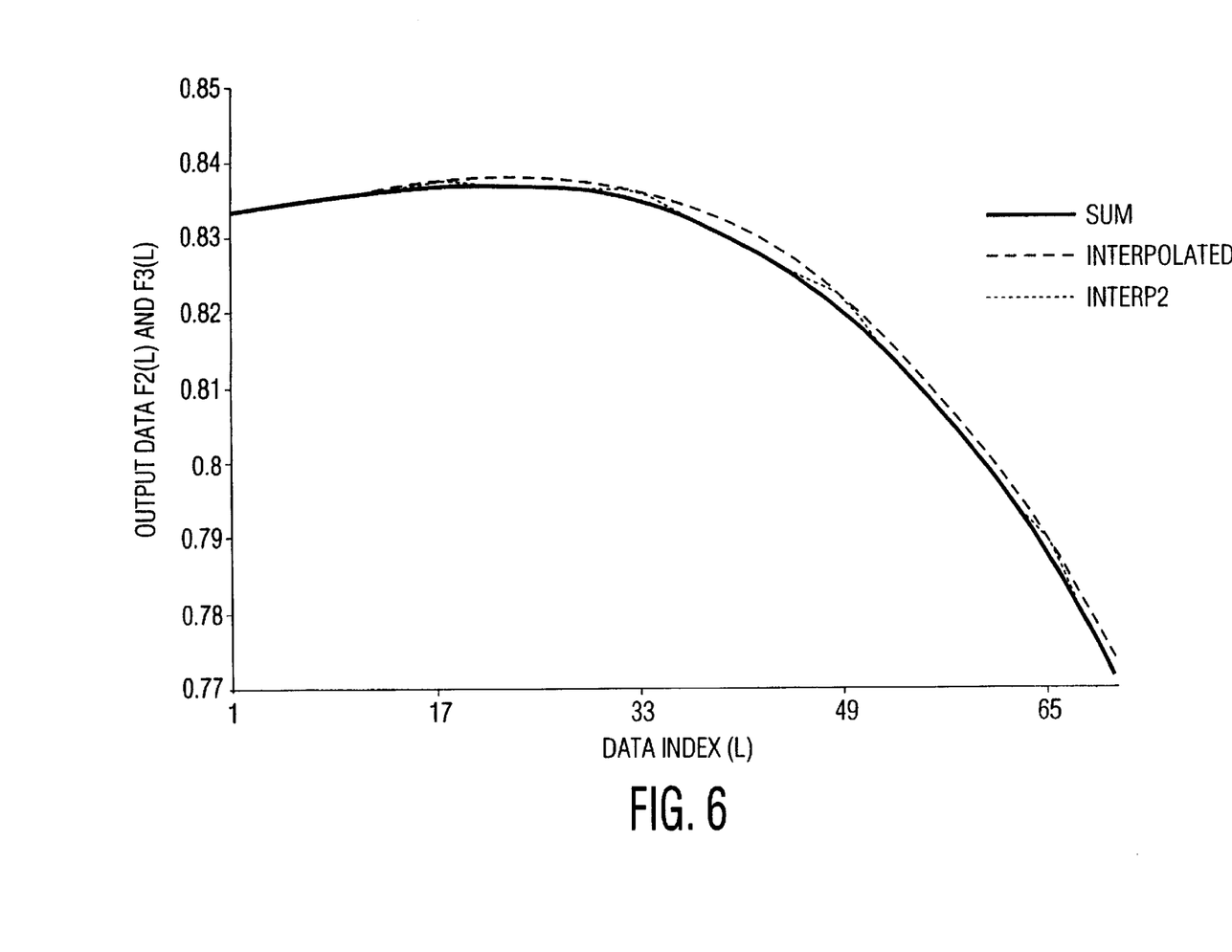
FIG. 6 graphically illustrates the effect of an interpolation method according to an aspect of this invention.

Comparisons of the effects of a linear interpolation versus an advantageous interpolation process as described with reference to FIG. 4A is illustrated in FIGS. 5 and 6. FIG. 5 shows the correspondence of the output F3(L) to the matrix points F1(M). The output curve F3(L) is smooth, but it does not intersect the adjustment points F1(M). FIG. 6 shows three plots as a function of L (abscissa). SUM represents an approximation of an ideal convergence correction curve that sums a sinusoidal waveform, a parabola and a linear waveform. The waveform 'Interpolated' represents a linear interpolation. 'Interp2' represents the inventive interpolation method as described with reference to FIG. 4A.

The interpolation process according to FIGS. 4A and 4B eliminates banding effects using a smoothing technique that causes the output values F3(L) to approach but usually not to cross the matrix adjustment values F1(M). The smoothing process rounds the curves approaching those matrix points at which a change of slope occurs, as shown in FIG. 5. The matrix adjustment values cannot be determined directly from the amount of vertical and horizontal displacement that correctly locates the corresponding point on the raster, because the output value F3(L), which actually displaces the raster via the convergence coil, is affected by the values of adjacent adjustment values in the matrix. In applying the invention to digital convergence correction it is possible to set and then adjust the values F1(M) in the correction matrix by observing the correction achieved by the output of the interpolation technique, F3(L). This effectively generates an artificial value for F1(M) as the input to the interpolation technique, namely the value that causes the resulting output value F3(L) to be precisely the value needed to accurately position the raster.

Figure 7:
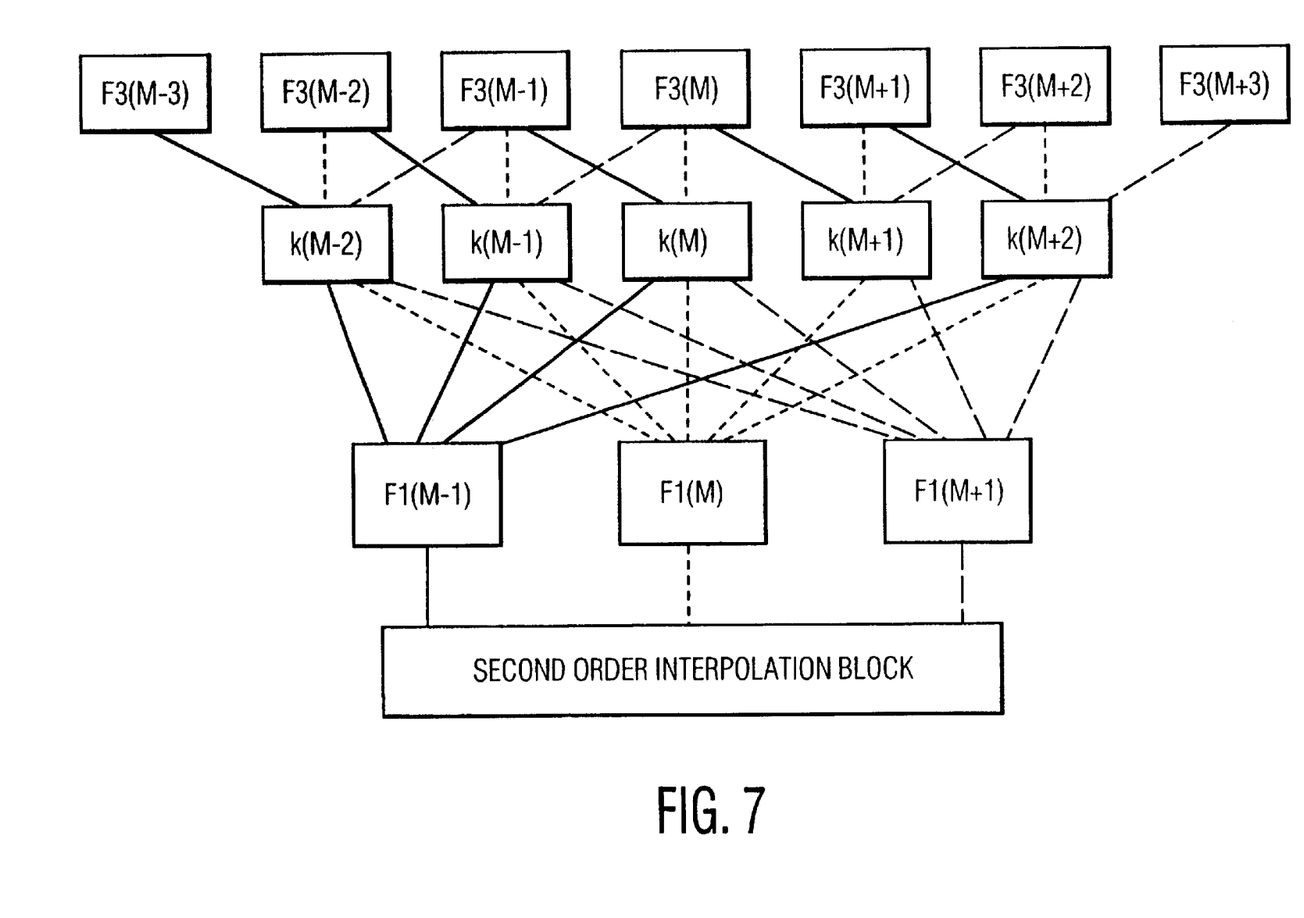
FIG. 7 is a block diagram according to a further aspect, illustrating the relationship of correction factors employed to generate a second order interpolation from linear interpolation factors determined from sectors that lead and trail a particular sector.

The more general problem presented when using sample values to generate an approximation of an input signal, does not involve an opportunity for operator feedback as a means to indirectly adjust sample values (or correction factors) to account for effects introduced by the smoothing technique. The available sample points are simply the digitized samples of an input signal to be regenerated. After interpolation it is desirable that the output signal be equal or very nearly equal to the input and sample values at corresponding times or positions. According to a further inventive aspect, the invention can smoothly interpolate between samples as described above, so as to approximate the input signal from which the samples were taken, using factors equal to samples of the input signal and producing an output that is equal to the input value at the sample positions, within any chosen precision. This is accomplished as shown in FIG. 7, in connection with the following description. A pre-emphasis technique generates sampling factors F1(M−1), F1(M) and F1(M+1), which are correction factors as used in a convergence application and can represent input sampling factors in other applications as well. Factors F1(M−1), F1(M) and F1(M+1) are used in the interpolation method described previously. A wider span of successive samples F3(M−n) through F3(M+n) thereby pre-emphasize the factors K that are applied to interpolate between the sample factors F1(M−1), F1(M) and F1(M+1), to regenerate the input signal.

The inventive interpolation method uses weighted factors that transition the slope of the curve from a value characterizing a sector preceding a sector being interpolated, to a value of a sector trailing the sector being interpolated. The general interpolation function to be solved is:

$F3(M)=F1(M)-(Navg/8)*(F1(M)-F1(M+1)/NL)-(Navg/8)*(F1(M)-F1(M-1)/NL)$ where:

Navg=the number of points being averaged, always a power of two and always<=NL;

NL=an arbitrary number of additional points to be interpolated;

F3(M)=the original sampled data which also is desired to be presented at the output; and, F1(M)=a pre-processed data value which is to be determined according to the invention and functions as an input factor to the interpolation function. F1(M) is processed from F3(M) to insert an emphasis representing the values of the signal F3(M) in adjacent sectors.

If the next previous equation is solved for F1(M), the result is:

$F1(M)=(4*NL/(4NL-Navg))*(F3(M)-(Navg/8*NL)*(F1(M+1)+F1(M-1)))$

This result is somewhat intractable. The value of F1(M) is determined in part by the values of F1(M+1) and F1(M−1). In the iteration for the next or previous interpolation segment, the value of F1(M) partly or completely determines the values of F1(M−1) and F1(M+1), rendering the equation recursive and apparently unsolvable. According to an inventive aspect, a solution is approximated to a given precision by letting F1(M+/−P)=F3(M+/−P), where P is a constant $\geq 1$. This provides a good approximation where the interaction has grown sufficiently small for the level of accuracy desired.

This approximated solution is in fact practical, as can be seen by expanding the most difficult case, namely where Navg=NL, for a typical size of interpolation segment. Then, $F1(M)=(4/3)*F3(M)-(1/6)*(M+1)+F1(M-1))$ Which expands to:

$F1(M)=(4/3)*F3(M)-(1/6)*(4/3)*(F3(M+1))+(1/6)*(1/6)*(2*F1(M)+F1(M+2)+F1(M-2))$

Which simplifies to:

$$F1(M)*(1-1/18)=(4/3)*F3(M)-(2/9)*(F3(M+1)+F3(M-1))+1/36*(F1(M+2)+F1(M-2))$$

and then expands to:

$$F1(M)*(1-1/18)=(4/3)*F3(M)-(2/9)*(F3(M+1)+F3(M-1))+(1/36)*(4/3)*F3(M+/-2)-(1/36)*(1/6)*(F1(M+/-3)+F1(M+/-1))$$

The solution can be expanded ad-infinitum. The interaction terms to be used in the expansion and the pre-emphasis provided, are decreasing with each component which is added, with an order of magnitude of $1/6\hat{\ }P$, where P is the number of points before or after M which are being examined. This is a critical result, because it shows that a solution is possible to an accuracy of $2/(6\hat{\ }p)$ when considering this number of terms. Thus an accuracy of 8 bits (one part in 256) is possible according to the invention, considering three terms of the series.

The foregoing approximation as shown in FIG. 7 is used to generate pre-emphasized or pre-processed values for F1 that are used as inputs to the interpolation process discussed above, for reproducing a curve from discrete sample values of an input signal F3(M-n) through F3(M+n). From the expansion, symmetrical coefficients of a pre-emphasis input filter are calculated as:

$$F1(M)=(4/3*18/17)*F3(M)-((2/9-4/(3*216))*18/17)*F3(M+/-)+1/27*(18/17)*F3(M+/-2)-(1/162)*(18/17)*F3(M+/-3)$$

The inventive method is useful as a numeric filtering process operable to interpolate additional data points between samples of a sampled data stream taken from an input signal. The invention is applicable to convergence correction as is the basic interpolation technique, as well as to other digital to analog conversions such as the vertical and horizontal conversions needed when up-converting video information from one format to another, and other such applications.

As an example of video format conversion, assuming a requirement to convert a 640×480 interlaced picture into a 1440×1080 interlaced picture, the invention is applicable to interpolate the data for the additional points to be displayed. The ratio of the two resolutions is 4/9(480=4*120, 1080=9*120). Given this, let Navg=8, NL=9, and select every 4th calculated point to be displayed.

Using these values and the equation F1(M)=(4*NL/(4NL-Navg))*(F3(M)-(Navg/8*NL)*F1(M+1)+F1(M-1))), as set forth above, we obtain:

$$F1(M)*(1-2*k1^4-2*k1^4-2*k1^6-\ldots)=$$

$$k2*(k1+k1^3+k1^5+\ldots)*F3(M+/-1)+$$

$$k2*(k1^2+2k1^4+2k1^6\ldots)*F3(M+/-2)-$$

$$k2*(k1^3+k1^5+k1^7\ldots)*F3(M+/-3)+$$

$$k2*(k1^4+k1^4+k1^6\ldots)*F3(M+/-4),$$

Where k2=4*NL(4*NL Navg), and k1=Navg/(2*(4*NL-Navg)).

In the specific case presented for video conversion, where NL=9 and Navg=8, k1=0.142857 and k2=1.285714. In order to obtain an accuracy of 8 bits, the terms are expanded including F3(M+/-3), since $k2*k3^3=3.756\times10E-3$. The pre-emphasis filtration then computes:

$$F1(M)=k2/(1-2k1^2)*F3(M)-(k2/(1-2k1^2))*($$

$$k1+K1^3)*(F3(M+1)+F3(M-1))+(k2/(1-2k1^2))*($$

$$k1^2)*(F3(M+2)+F3(M-2))-(k2/(1-2k1^2))*($$

$$k1^3)*(F3(M+3)+F3(M-3)).$$

Figure 8:
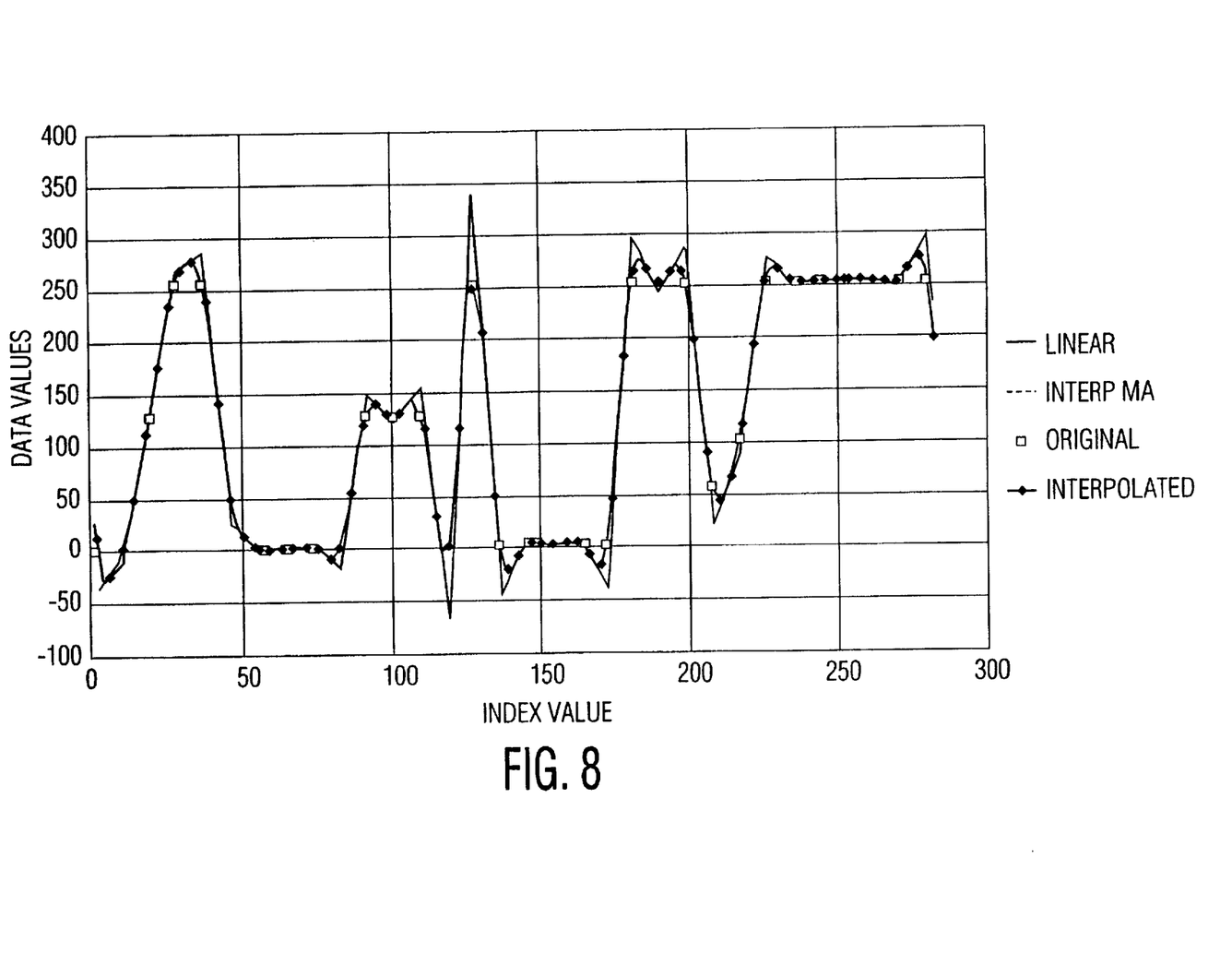
FIG. 8 is a plot of a random signal with sample values shown by hollow squares and interpolated output values according to the invention shown in solid diamonds. Linear and smoothed representations of the sample value signal and the output value signal are shown by background lines.

The result is a relatively accurate curve that passes through the original data points of the 640×480 digitized image data within ± one bit. FIG. 8 graphically illustrates the correspondence of the interpolated data and the input data points, using a random data set. The original data points are shown as rectangles, and the interpolated data points are shown as diamonds. The straight lines are the pre-emphasized data connected linearly. The curved line is the interpolated data expanded and connected by a second-order curve.

The calculations as disclosed above can be accomplished by the internal microprocessor 102 of a digital convergence circuit or other available processor. It is not necessary to provide an external processor in the signal path to generate converted data. The frame of RAM memory needed in the digital convergence circuit is actually smaller than that needed in a conventional digital convergence system.

One way of generating correction waveforms based on stored correction data is to provide a RAM data array which is X by Y1 by 2 by 3, where X is the number of horizontal correction points and Y1 is the number of lines in the field. Y1=Y*NL. To avoid using a large frame of memory, the inventive interpolation method can generate the interpolated or converted data from the stored data on a real-time basis. The amount of time available is the horizontal line time (e.g., approximately 63 microseconds) divided by X. Preferably, a parallel process is implemented for each color. A relatively simple-calculation is provided according to the invention (having minimal multiplies, divides, adds and subtracts). Preferably, binary factors are chosen or result from the conditions placed on the factors (e.g., factor P). This enables the use of simple shifts or truncations in lieu of adds (or subtracts) and shifts in effecting multiply and divide operations using binary or floating point multiply and divide operations. As a result, the output data is produced with minimal processing hardware and processing power as compared to conventional curve fitting methods using polynomial curve fitting involving exponential calculations, numerous multiplication/division and addition/subtraction operations that may be impractical to attempt in real time.

Linear interpolation can be accomplished using one multiply and one add operation. Using the inventive interpolation method of pre-emphasizing factors to generate values F1(M-1) through F1(M+1) as inputs to the second order interpolation block, two multiplies and two adds are required.

It should be noted that there is not a direct relationship between the pre-emphasis interval and the interpolation interval. The interpolation algorithm uses exactly three input data samples per interval in the presently preferred embodiment. More than three input sample values can be used but the calculations much more complex. The accuracy of the output waveform is determined by the combination of the interpolation constants chosen and the number of input sample values which are used in the pre-emphasis calculation. The trade-off is between accuracy and mathematical complexity, or in other words, the speed and cost of the calculation.

When using exactly three input sample values for the interpolation interval, and using three input sample values in the pre-emphasis interval, the interpolated output curve approximates the input curve within a precision of approximately 6%. When using five input sample values in the pre-emphasis interval, the interpolated output curve approximates the input curve within a precision of approximately 1%. When using seven input sample values in the pre-emphasis interval, the interpolated output curve approximates the input curve within a precision of approximately 0.1%.

The inventive technique is applicable to provide a smooth approximated interpolation of extended functions generally, and can fit an interpolated curve (i.e., can smoothly add values between spaced sample values) to an input for purposes such as digital video, audio or any situation in which the input sampling rate or density of values is lower than that of the desired output.

What is claimed is:

1. A method for generating in real time an output curve from a plurality of successive output data values determined from a plurality of input sample values smaller in number than said plurality of output data values, the method comprising the steps of:

defining successive and overlapping interpolation intervals including a given number of said input sample values;

linearly interpolating said input sample values in each said interpolation interval to generate said output data values defining said output curve, said linear interpolating occurring over all of each said interpolating interval;

emphasizing differently the influence of said given number of input samples during said linear interpolating;

pre-emphasizing said plurality of input sample values;

linearly interpolating said pre-emphasized input sample values; and, calculating a moving average of said output data values concurrently with said linear interpolating, but in successive spans of said output data values leading and trailing each said pre-emphasized input sample value, each said span having fewer numbers of said output data values than are generated in each said interpolating interval, said output data values being modified by said moving average to impart smoothly varying incremental slopes to said output curve, whereby said pre-emphasizing step brings said output curve controllably close to each of said input sample values.

2. The method of claim 1, wherein said pre-emphasizing step comprises the steps of:

generating sampling factors based on said input sample values; and, using said sampling factors in said interpolating step.

3. The method of claim 2, comprising the step of generating said sampling factors based on exactly three of said input sample values.

4. The method of claim 2, comprising the step of generating said sampling factors based on at least five of said input sample values.

5. The method of claim 2, comprising the step of generating said sampling factors based on at least seven of said input sample values.

6. The method of claim 1, comprising the step of including exactly three of said pre-emphasized input sample values in each said interval.

7. The method of claim 1, comprising the step of including at least five of said pre-emphasized input sample values in each said interval.

8. The method of claim 1, comprising the step of including at least seven of said pre-emphasized input sample values in each said interval.

9. The method of claim 1, wherein said emphasizing step comprises the steps of:

ordering said pre-emphasized input sample values in each said interval such that a given one of said pre-emphasized input samples is preceded by a pre-emphasized input sample value and followed by a trailing pre-emphasized input sample value;

emphasizing the influence of said preceding pre-emphasized input sample value when calculating said output data values preceding said given pre-emphasized input sample value; and, emphasizing the influence of said following pre-emphasized input sample value when calculating said output data values following said given pre-emphasized input sample value.

10. The method of claim 1, comprising the step of shifting each said span by a selected number (P) of said output data samples.

11. The method of claim 1, comprising the steps of:

shifting each said span by a number of said output data values P; and, selecting a value for P such that P is less than the number of lines in each said interpolation interval (P<NL) and 2*P is a power of two.

* * * * *